United States Patent [19]

Goeldner

[11] Patent Number: 4,734,167

[45] Date of Patent: Mar. 29, 1988

[54] DISTILLATION APPARATUS

[75] Inventor: Richard W. Goeldner, Freeport, Fla.

[73] Assignee: Mechanical Equipment Company, Inc., Destin, Fla.

[21] Appl. No.: 873,857

[22] Filed: Jun. 11, 1986

Related U.S. Application Data

[63] Continuation of Ser. No. 746,981, Jun. 19, 1985, abandoned.

[51] Int. Cl.⁴ .................. C02F 1/04; B01D 1/28
[52] U.S. Cl. .................. 202/176; 202/182; 202/197; 202/235; 202/237; 159/DIG. 31; 203/11; 203/26; 203/100; 203/DIG. 24
[58] Field of Search .......... 203/4, 11, 26, 39, 40, 203/95, 100, DIG. 7, DIG. 24; 202/176, 197, 235, 234, 182, 166, 167, 237; 159/DIG. 31, 24.2, 24.3, 27.1

[56] References Cited

U.S. PATENT DOCUMENTS

| | | | |
|---|---|---|---|
| 3,192,130 | 6/1965 | Pottharst | 203/26 |
| 3,389,059 | 6/1968 | Goeldner | 203/10 |
| 3,471,373 | 10/1969 | Pottharst | 203/26 |
| 3,488,261 | 1/1970 | Loebel | 203/26 |
| 3,748,234 | 7/1973 | Pottharst, Jr. | 202/187 |
| 4,002,538 | 1/1977 | Pottharst, Jr. | 203/10 |
| 4,030,985 | 6/1977 | Barba et al. | 203/26 |
| 4,260,461 | 4/1981 | Pottharst, Jr. | 203/26 X |

OTHER PUBLICATIONS

Brochure dated 1985 entitled "MECO's New Breed of Marine Vapor Compression Distillers is Lowering Costs on the High Seas."

Primary Examiner—Wilbur Bascomb
Attorney, Agent, or Firm—Wood, Dalton, Phillips, Mason & Rowe

[57] ABSTRACT

A compact and energy efficient water distillation unit is disclosed including a housing divided by shared interior walls into deaerator, heater and evaporator chambers. A deaerator is mounted in the deaerator chamber. An evaporator is mounted in the evaporator chamber and a vapor compressor is provided for drawing water vapor produced by the evaporator through a demister and outputting the vapor into a duct open to the evaporator. The duct is at least partially located above the heater chamber and open thereto. A heater is mounted in the heater chamber. A duct interconnects the evaporator with the deaerator chamber and a vertical standpipe connects the deaerator and evaporator chambers.

11 Claims, 4 Drawing Figures

DISTILLATION APPARATUS

This is a continuation of application Ser. No. 746,981, filed June 19, 1985 and now abandoned.

BACKGROUND OF THE INVENTION

1. Technical Field

This invention relates to a water distillation unit and more particularly to a compact and energy efficient water distillation unit.

2. Background Art

Water distillation is, of course, well known in the art, as are apparatuses which perform the distillation. A few such apparatuses are shown in, for example, U.S. Pat. Nos. 3,748,234, 4,002,538 and 4,260,461.

U.S. Pat. No. 4,260,461, which is incorporated herein by reference, discloses a known apparatus which includes a deaerator for deaerating feedwater, and an evaporator assembly for distilling the water including a tube bundle with a shell, a demister and a compressor. A heater assembly to aid in startup and to make up for heat losses is also often used with apparatuses of this type.

One problem with prior art distillation apparatuses has been heat losses. Since the distillation process requires fairly high operating temperatures (in excess of 200° F.), such heat losses can significantly increase the energy usage of the apparatus. The various surfaces of prior art apparatuses have been insulated so as to somewhat reduce the heat loss problem, but insulating the many surfaces increases the manufacturing cost of the apparatuses.

Yet another problem with many prior art distillation apparatuses is that they occupy significant volume and floor space. Distillation apparatuses are, of course, commonly used on ocean-going ships and oil platforms at sea to produce the crew's needs of clean water from the plentiful seawater, and space is at a premium on such ships. Further, in the case of ships used for military purposes, the design of distillers to withstand the shock and vibration of under water explosions is also a problem.

The present invention is directed toward overcoming one or more of the problems as set forth above.

SUMMARY OF THE INVENTION

In one aspect of the present invention, a compact and energy efficient water distillation unit is disclosed including a housing divided by shared interior walls into deaerator, heater and evaporator chambers. A deaerator is mounted in the deaerator chamber. An evaporator is mounted in the evaporator chamber and a vapor compressor is provided for drawing water vapor produced by the evaporator through a demister and outputting the vapor into a duct open to the evaporator. The duct is at least partially located above the heater chamber and open thereto. A heater is located in the heater chamber. A baffle interconnects the evaporator with the deaerator chamber, and a vertical standpipe connects the deaerator and evaporator chambers.

It is an object of the present invention to minimize the heat loss of the distilling unit to thereby maximize its energy efficiency. It is another object of the present invention to minimize the manufacturing cost of the distillation unit. Still another object of the present invention is to minimize the volume and floor space which the unit occupies. A further objective of the invention is to produce a distiller with great resistance to mechanical shock and vibration.

DESCRIPTION OF THE PREFERRED EMBODIMENT

Figure 1:
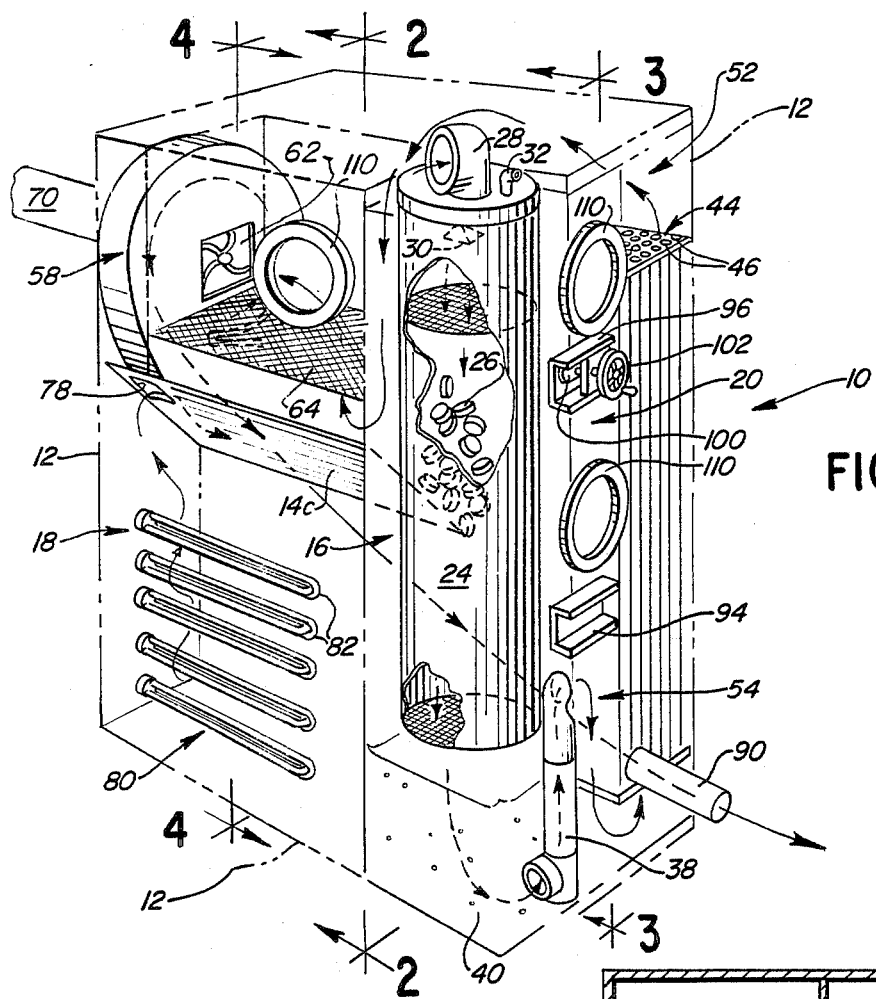
FIG. 1 is a perspective view of the water distillation unit with its outer housing shown in phantom.
Figure 2:
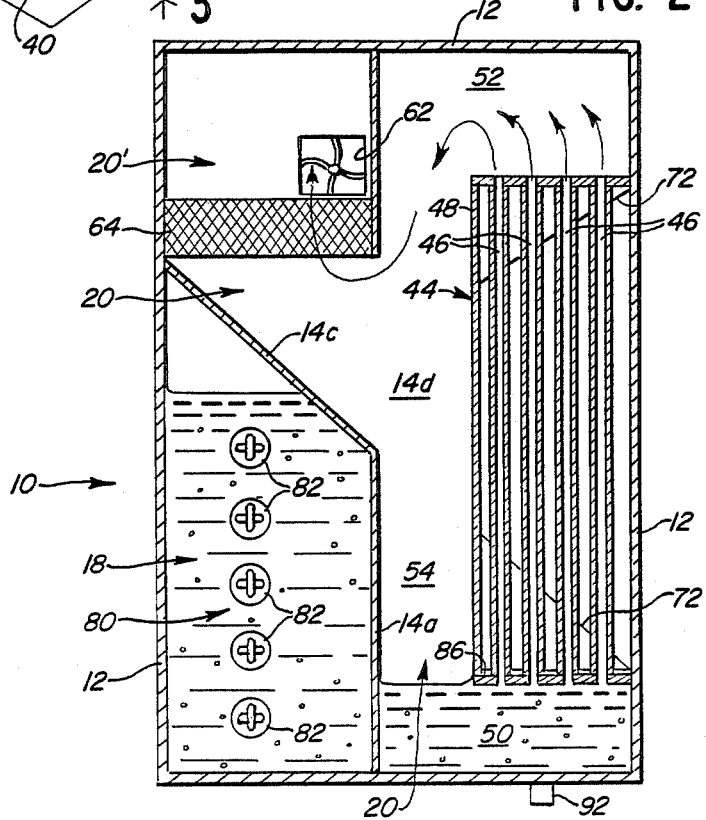
FIG. 2 is a cross-sectional view taken through the plane indicated by arrow 2 in FIG. 1.
Figure 3:
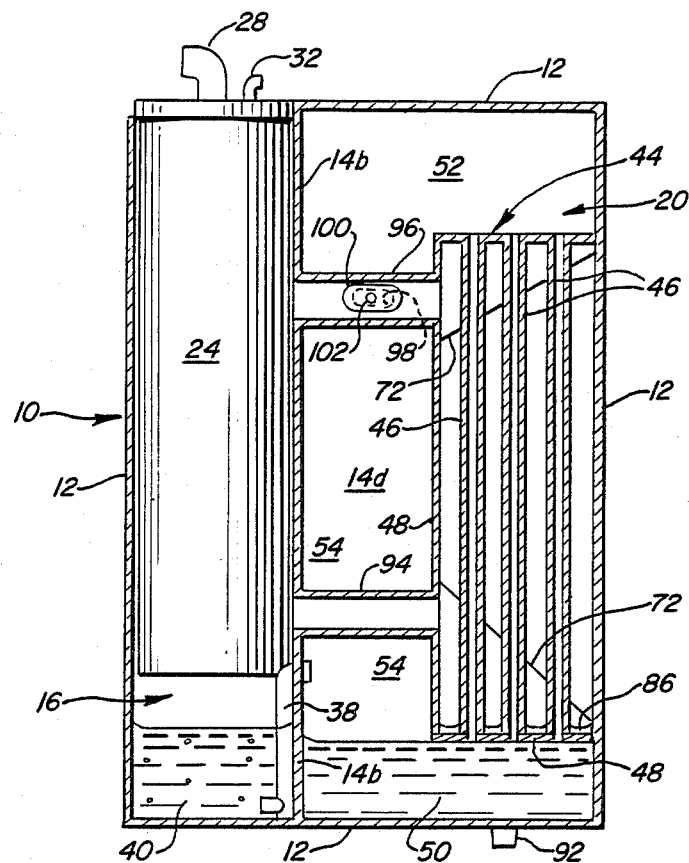
FIG. 3 is a cross-sectional view taken through the plane indicated by arrow 3 in FIG. 1.

The compact and energy efficient water distillation unit 10 of the present invention is shown in FIG. 1 with its housing 12 in phantom. The housing 12 is substantially rectangular when viewed from above and includes interior walls 14a-d (see FIGS. 2-4) which divide the unit 10 into three basic chambers: a deaerator chamber 16, a heater chamber 18, and an evaporator chamber 20. These chambers are interconnected and disposed relative to one another as hereinafter described so that minimal volume and floor space is required. Further, only the outer housing 12 need be insulated and thus minimal insulation is required, and heat loss is minimized as well.

Located in the deaerator chamber 16 is a suitable deaerator tower 24 made, for example, of high-temperature-resistant, fiberglass-reinforced plastic. Within the tower 24 is a suitable packing 26 which may be, for example, the ballast ring-type made of polypropylene plastic. An input connector 28 is provided at the top of the tower 24 and feedwater is received therethrough and sprayed through a nozzle 30 over the top of the packing 26 to distribute it evenly. The feedwater then trickles down through the packing 26 while the evaporator-vented steam heats and deaerates the feedwater (as further described below).

As the feedwater (typically seawater) passes through the tower packing 26, gases from the atmosphere which are dissolved in the feedwater, such as oxygen, nitrogen, and carbon dioxide, are removed. Removal of these gases prevents undesirable gas blanketing of the heat transfer surfaces of the unit 10 (such blanketing would hinder heat transfer) and also reduces the rate of corrosion in the unit 10.

A suitable vent 32 is also provided in the top of the tower 24 to discharge gases stripped in the deaerator chamber 16 to the atmosphere.

The deaerator chamber 16 is connected to the evaporator chamber 20 by a standpipe 38. Inasmuch as the pressure in the deaerator chamber 16 is greater than that in the evaporator chamber 20 (as is further described below), the deaerated water 40 in the bottom of the deaerator chamber 16 is forced up through the standpipe 38 into the evaporator chamber 20. The standpipe 38 thus also acts as a seal for the evaporator chamber 20.

Supported above the bottom of the evaporator chamber 20 is a suitable evaporator 44 which consists of a vertical bundle of tubes or calandria 46 which are open on both ends and encased in a shell 48. As is known to those skilled in the art, the interior of the tubes 46 of the evaporator 44 is maintained separate from the interior of the evaporator shell 48 such that the tubes 46 act as a heat exchanger in the distillation process. The evaporator feedwater 50 in the bottom of the evaporator chamber 20 is thus heated and caused to rise through the tubes 46, some of the feedwater 50 being vaporized in the process. The vaporized water rises into the dome 52 in the top of the chamber 20 and is drawn therefrom for further processing as described below. That water 50 which rises through the tubes 46 but is not vaporized falls back down around the evaporator shell 48 through a downcomer space 54 and remixes with the feedwater 50 for repeated processing through the tubes 46.

Though not shown in the figures, a number of different components may be and typically are included with the evaporator 44 to enhance operation. Specifically, distillate level and feedwater level gauges may be installed in the evaporator chamber 20 and shell 48 to indicate the respective water levels. A vacuum check valve may also be provided to protect the evaporator chamber 20 when shutting the unit 10 down, and a pressure relief valve may be provided to prevent overpressurization of the chamber 20. A high water level switch may further be provided to shut the unit 10 down if feedwater 50 exceeds the normal operating level in the evaporator chamber 20. Also, a high evaporator chamber temperature switch may be provided to shut the unit 10 down should high temperature or excessive compressor surge occur.

Figure 4:
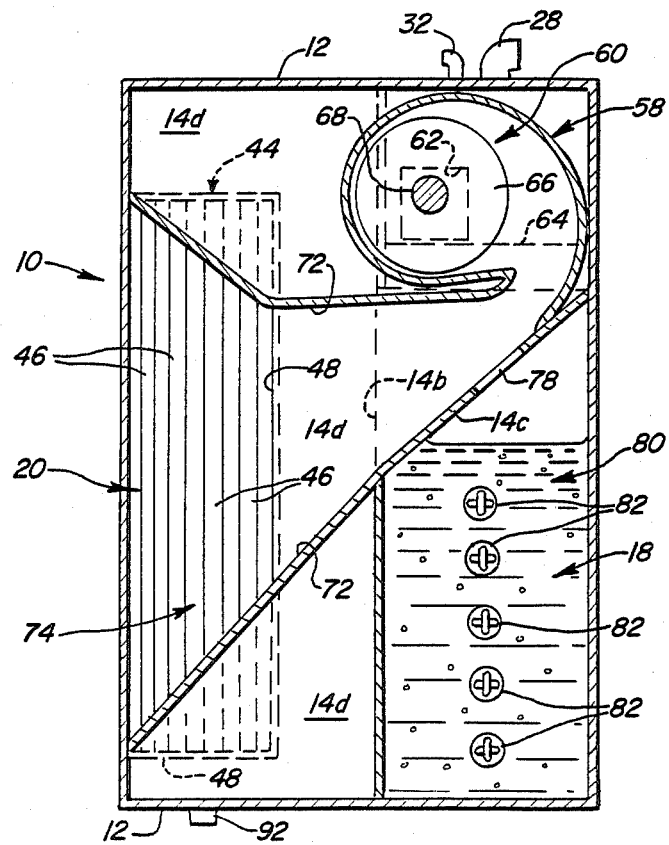
FIG. 4 is a cross-sectional view taken through the plane indicated by arrow 4 in FIG. 1.

The volute 58 of the compressor unit 60 is also formed integrally with the unit 10 at one end thereof (best shown in FIG. 4). The volute 58 is open through passage 62 to the evaporator chamber portion 20' extending over the heater chamber 18. A suitable demister 64 extends across the opening in the evaporator chamber portion 20' to remove water mist from the vapor passing therethrough.

To avoid clutter in the figures, the remainder of the compressor unit 60 is shown partially in FIG. 4 only. Specifically, an impeller 66 having suitable vanes (facing rearwardly in FIG. 4 and thus not shown) and supported for rotation on a shaft 68 is located adjacent the volute passage 62. A bearing housing 70 (see FIG. 1) rotatably supporting the shaft 68 is suitably mounted to the side of the unit 10 and is connected to a suitable drive mechanism (not shown) which drives the impeller 66.

The compressor unit 60 may thus be of any suitable design, though a V-belt driven, high speed, precision balanced centrifugal compressor is one type which is known to be suitable. The compressor unit 60 preferably should also have suitable seals to separate the compressor drive structure from the vapor compressed thereby. The impeller 66 may also be of any suitable design, many of which are known to those skilled in the art.

The compressor unit 60 thus operates to draw vapor from the evaporator chamber 20 through the demister 64 and passage 62, increasing the pressure of the vapor which is directed by the volute duct 72 toward the open end 74 of the evaporator shell 48 and thus into the shell 48. The volute duct 72 should be shaped so as to gradually decrease the velocity of the vapor as it leaves the impeller 66 to convert the velocity energy into pressure increase with a minimum of loss. The pressure increase is desirable in the distillation process since it increases the condensing temperature of the vapor to thereby maximize heat transfer across the tubes 46.

An opening 78 in the volute duct 72 connects the heater chamber 18 and the duct 72. An electric boiler 80 is located in the heater chamber 18 for the generation of low pressure steam to provide initial starting heat and to provide make-up for operating heat losses. Immersion heater elements 82 provide the heat source for steam generation. The immersion heater elements 82 are capable of generating steam in the heater chamber 18 at a pressure greater than that existing in the evaporator tubes 46 and dome 52. This steam enters the duct 72, and thus the evaporator shell 48, augmenting steam from the compressor 62, and transfers heat through the walls of the evaporator tubes 46 to boil the feedwater 50. Heat generated by the boiler 80 also passes through the interior walls 14a-c to heat the deaerator and evaporator chambers 16,20 as well.

As is known in the art, the compressed vapor condenses on the outside of the tubes 46 as it exchanges heat therethrough, and the condensate or distillate 86 runs down the tubes 46 to the bottom of the evaporator shell 48. The distillate 86 then may be pumped from the shell 48 out a suitable output connector 90.

A drain 92 (see FIG. 2) is also provided in the bottom of the evaporator chamber to remove brine therefrom (brine being the water having a high concentration of, for example, salt as the distillate is produced therefrom).

A pair of ducts 94,96 are provided against the housing 12 at the shell end opposite the compressor volute duct 72 to connect the deaerator chamber 16 and the shell 48. These ducts 94,96 thus vent uncondensed steam and non-condensable gases into the deaerator chamber 16 for use in heating and deaerating the feedwater.

One of the ducts 96 includes an opening 98 therethrough and has a valve member 100 which is seated thereon during normal operation. When the valve member 100 is unseated, the evaporator shell 48 is opened up to the downcomer space 54 so that the compressor input and output are connected. This allows compressed vapor to bypass the heating surface (i.e. tubes 46) of the evaporator assembly 44 and pass back into the suction of the compressor unit 60, thereby preventing compressor surge during start-up before stable heat transfer is achieved in the evaporator assembly 44. During the process of start-up, the valve member 100 is gradually moved toward the opening 98 as heat builds up in the unit 10 and the heat transfer process increases.

The valve member 100 is shown secured to a screw knob 102 so that it may be manually adjusted during start-up. Suitable automatic adjusting means may also be provided for adjusting the valve member 100.

Windows 110 may also be provided at suitable locations in the housing 12 so that the operator can view the conditions therein.

Though not shown, still other suitable components, such as chemical injection systems, controls, and instrumentation, may be used with the basic unit 10 described above so as to maximize the efficiency of its operation.

With the present invention, the major components of a water distillation unit are disposed relative to one another so that the volume and floor space required for the unit is minimized. This is particularly important in the many uses of distillation units where there are space limitations (e.g. on ocean-going ships). Further, by arranging the components in the manner shown, heat loss is minimized and the insulation necessary for the unit is also minimized. Still further, the cost of connecting the various unit components is minimized as is the need for special separate shock resistant mountings for the components and connectors.

Other aspects, objects and advantages of the invention can be obtained from a study of the drawings, the specification and the appended claims.

What is claimed is:

1. A compact and energy efficient water distillation unit, comprising:
   a substantially rectangular housing including a deaerator chamber, a heater chamber, and an evaporator chamber having a portion disposed above the heater chamber, said chambers being separated by shared interior walls;
   a deaerator supported in the deaerator chamber and including an input for feed water;
   a passage between the deaerator chamber and evaporator chamber for feeding deaerated water into the evaporator chamber;
   a heater supported in the heater chamber, said heater chamber communicating with the evaporator chamber to add heat to the unit;
   an evaporator supported in the evaporator chamber and spaced from at least one wall in the evaporator chamber to define a downcomer space therebetween, said evaporator including vertical tubes therethrough;
   a demister suported in the evaporator chamber;
   a vapor compressor having an input and an output, said input drawing water vapor through the demister; and
   a duct between the compressor output and the evaporator.

2. The distillation unit of claim 1, wherein said duct is at least in part disposed above the heater chamber, and further comprising water in the heat chamber and an opening defined in the duct communicating with the heater.

3. The distillation unit of claim 1, further comprising a duct defining a second passage between the evaporator and the deaerator chamber.

4. The distillation unit of claim 3, wherein said passage comprises a vertical standpipe open at its upper end to the evaporator chamber.

5. A compact and energy efficient water distillation unit, comprising:
   a substantially rectangular insulated housing;
   a first interior wall member defining a deaerator chamber in one corner of the housing;
   a deaerator within said deaerator chamber;
   a second interior wall member which, together with a portion of said first interior wall member, defines a heater in said housing, said second wall member extending less than the full height of the housing;
   means for generating steam in said heater chamber;
   a third interior wall overlying said heater chamber and defining the upper wall thereof;
   an evaporator mounted within an evaporator chamber, said evaporator chamber substantially being the housing interior excluding the heater chamber and the deaerator chamber, and said evaporator including a shell having a tube bundle extending therethrough, said shell being open to the heater chamber;
   a compressor having an output and adapted to compress vapors from said eavporator chamber; and
   a duct connecting the compressor output to the shell.

6. The distillation unit of claim 5, further comprising a standpipe having an upper end open to said evaporator chamber and a lower end open to said deaerator chamber.

7. The distillation unit of claim 5, wherein said evaporator is spaced from said first interior wall so as to define a downcomer space therebeween, and further comprising a duct across said downcomer space connecting said deaerator chamber to said evaporator shell.

8. The distillation unit of claim 7, further comprising a standpipe having an upper end open to said evaporator chamber and a lower end open to said deaerator chamber.

9. The distillation unit of claim 7, further comprising a valve operable to open said duct to said evaporator chamber.

10. The distillation unit of claim 5, further comprising a demister adapted to remove mist from vapors prior to compression by the compressor.

11. A compact vapor compression distiller having a demister and a vapor compressor, comprising:
    a deaerator for removing dissolved gases from entering feedwater;
    a boiler for providing steam heat to supplement heat derived from compressed vapors in the evaporating process;
    a rectangular array of vertical tubes for conducting the evaporating process with boiling water inside the tubes and condensing compressed water vapor outside the tubes;
    a substantially rectangular housing with first and second parallel vertical walls longer than third and fourth parallel vertical walls interconnecting the first and second vertical walls, said array of tubes being disposed adjacent to the first vertical wall of the housing, the deaerator being disposed in a corner adjacent to the second and third vertical walls of the housing, and the boulder being disposed in a corner adjacent to the second and fourth vertical walls and the lower portion of the deaerator, with a first space in the housing above the boiler conducting vapors generated in the evaporating process through the demister prior to entry into the vapor compressor, and a second space between the array of tubes and the deaerator and boiler constituting a downcomer for boiling water circulating through said tubes.

* * * * *